United States Patent
Sahu et al.

(10) Patent No.: US 12,050,695 B2
(45) Date of Patent: Jul. 30, 2024

(54) METHOD AND SYSTEM FOR IDENTIFYING SECURITY VULNERABILITIES

(71) Applicant: Tata Consultancy Services Limited, Mumbai (IN)

(72) Inventors: Monika Sahu, Pune (IN); Kumar Mansukhlal Vidhani, Pune (IN); Harshal Tupasamudre, Pune (IN); Sachin Premsukh Lodha, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 280 days.

(21) Appl. No.: 17/650,947

(22) Filed: Feb. 14, 2022

(65) Prior Publication Data
US 2022/0300615 A1  Sep. 22, 2022

(30) Foreign Application Priority Data
Feb. 12, 2021  (IN) .............................. 202121006132

(51) Int. Cl.
*G06F 21/57* (2013.01)
(52) U.S. Cl.
CPC ...... *G06F 21/577* (2013.01); *G06F 2221/033* (2013.01)
(58) Field of Classification Search
CPC .......................... G06F 21/577; G06F 2221/033
See application file for complete search history.

(56) References Cited

U.S. PATENT DOCUMENTS

| | | | |
|---|---|---|---|
| 8,402,440 B2* | 3/2013 | Sankaranarayanan | ...................... G06F 11/3608 717/124 |
| 9,128,728 B2* | 9/2015 | Siman | .................. G06F 16/9024 |
| 9,378,377 B1* | 6/2016 | Kuan | .................... G06F 21/577 |

(Continued)

OTHER PUBLICATIONS

Julian Thomé, Lwin Khin Shar, Domenico Bianculli, Lionel Briand, Security slicing for auditing common injection vulnerabilities, Journal of Systems and Software, vol. 137, (Year: 2008).*

(Continued)

*Primary Examiner* — Harris C Wang
(74) *Attorney, Agent, or Firm* — FINNEGAN, HENDERSON, FARABOW, GARRETT & DUNNER, LLP

(57) ABSTRACT

Several data breaches are occurring in organizations due to insecure handling security-sensitive data. Conventional methods utilize static analysis tools and fail to capture all security vulnerabilities. The present disclosure identifies a security vulnerability by analyzing a source code. Initially, a System Dependence Graph (SDG) associated with the source code is received. Forward slicing is performed on the SDG and a plurality of forward function nodes are obtained. A plurality of security parameters associated with the security-sensitive variable are obtained. A backward slicing is performed based on a plurality of security parameters to obtain a plurality of backward function nodes. Further, a plurality of common function nodes is obtained from the plurality of forward and the backward function nodes and utilized to generate a plurality of enumerated paths. The enumerated paths are evaluated to obtain a plurality of feasible paths and are further analyzed to identify security vulnerability.

15 Claims, 8 Drawing Sheets

(56) References Cited

U.S. PATENT DOCUMENTS

| | | | |
|---|---|---|---|
| 2010/0083240 A1* | 4/2010 | Siman | G06F 16/245 |
| | | | 717/144 |
| 2010/0198799 A1* | 8/2010 | Krishnan | G06F 11/3696 |
| | | | 706/46 |
| 2012/0304153 A1* | 11/2012 | Li | G06F 8/75 |
| | | | 717/123 |
| 2019/0108003 A1* | 4/2019 | Xiao | G06F 11/3604 |
| 2021/0099295 A1* | 4/2021 | Li | H04L 9/3226 |
| 2022/0300615 A1* | 9/2022 | Sahu | G06F 21/577 |

OTHER PUBLICATIONS

Kebbal, D. "Automatic flow analysis using symbolic execution and path enumeration", International Conference on Parallel Processing Workshops (ICPPW06), Date: 2006, Publisher: IEEE, https://www.irit.fr/publis/TRACES/6678_IWEC.pdf.

* cited by examiner

METHOD AND SYSTEM FOR IDENTIFYING SECURITY VULNERABILITIES

PRIORITY CLAIM

This U.S. patent application claims priority under 35 U.S.C. § 119 to: India Application No. 202121006132, filed on Feb. 12, 2021. The entire contents of the aforementioned application are incorporated herein by reference.

TECHNICAL FIELD

The disclosure herein generally relates to the field of application security and, more particular, to a method and system for identifying security vulnerabilities.

BACKGROUND

Application security issues pose an imminent and growing threat, caused by security bugs in the code of an application. Security-sensitive data of an application like password variables, encryption keys, block ciphers are commonly used for providing authentication to users and for secure handling of data. A few data breaches that occurred recently in different organizations unveiled various security issues in handling security-sensitive data. Generally, the security breach is caused by security bugs in the code of an application which in turn jeopardize the security of its users and put the security of the application users at risk. Therefore, it is important to detect security issues in the handling of security-sensitive variables of the application and fix them in timely fashion.

Conventional methods utilize multiple static analysis based tools to detect handling of the security-sensitive data. The static analysis tools scan the application code using a predefined set of security rules and detect candidate vulnerabilities. The detected candidate vulnerabilities are reported to the user. However, the conventional static analysis tools can detect only static security parameters and fail to address all issues pertaining to insecure handling of such security-sensitive data. The conventional methods are facing challenges like incomplete coverage, improper recommendations, and imprecise implementation. For example, the conventional methods can detect only a few vulnerabilities including usage of an insecure cryptographic hash function, usage of a static salt, and usage of a hash function with insufficient computational effort. Further, many conventional static analysis tools produce imprecise results and hence there is a challenge in identifying security vulnerability accurately and efficiently.

SUMMARY

Embodiments of the present disclosure present technological improvements as solutions to one or more of the above-mentioned technical problems recognized by the inventors in conventional systems. For example, in one embodiment, a method for identifying security vulnerabilities is provided. The method includes receiving, by one or more hardware processors, a security-sensitive variable, wherein a source code associated with the security-sensitive variable is represented in the form of a System Dependence Graph (SDG). The method further includes obtaining, by the one or more hardware processors, a plurality of forward function nodes associated with the security-sensitive variable by performing a forward slicing on the SDG. The method further includes obtaining, by the one or more hardware processors, a plurality of security parameters associated with the security-sensitive variable from the SDG. The method further includes obtaining, by the one or more hardware processors, a plurality of backward function nodes corresponding to the plurality of security parameters by performing a backward slicing on the SDG. The method further includes obtaining, by the one or more hardware processors, a plurality of matching function nodes by comparing the plurality of forward functions nodes and the plurality of backward function nodes. The method further includes enumerating, by the one or more hardware processors, a plurality of directed paths based on the plurality of matching function nodes using a Depth First Search (DFS) with backtracking. The method further includes evaluating, by the one or more hardware processors, a path condition associated with each function node of each of the plurality of enumerated directed paths to obtain a plurality of feasible paths, wherein the enumerated path is feasible only if the path condition associated with each function node is evaluated. The method finally includes analyzing, by the one or more hardware processors, each of the plurality of feasible paths based on a plurality of data conditions to identify a security vulnerability associated with the security-sensitive variable using a path-based security guarantee model.

In another aspect, a system for identifying security vulnerabilities is provided. The system includes at least one memory storing programmed instructions, one or more Input/Output (I/O) interfaces, and one or more hardware processors operatively coupled to the at least one memory, wherein the one or more hardware processors are configured by the programmed instructions to receive a security-sensitive variable, wherein a source code associated with the security-sensitive variable is represented in the form of a System Dependence Graph (SDG). Further, the one or more hardware processors are configured by the programmed instructions to obtain a plurality of forward function nodes associated with the security-sensitive variable by performing a forward slicing on the SDG. Further, the one or more hardware processors are configured by the programmed instructions to obtain a plurality of security parameters associated with the security-sensitive variable from the SDG. Further, the one or more hardware processors are configured by the programmed instructions to obtain a plurality of backward function nodes corresponding to the plurality of security parameters by performing a backward slicing on the SDG. Further, the one or more hardware processors are configured by the programmed instructions to obtain a plurality of matching function nodes by comparing the plurality of forward functions nodes and the plurality of backward function nodes. Further, the one or more hardware processors are configured by the programmed instructions to enumerate a plurality of directed paths based on the plurality of matching function nodes using a Depth First Search (DFS) with backtracking. Further, the one or more hardware processors are configured by the programmed instructions to evaluate a path condition associated with each function node of each of the plurality of enumerated directed paths to obtain a plurality of feasible paths, wherein the enumerated path is feasible only if the path condition associated with each function node is evaluated. Finally, the one or more hardware processors are configured by the programmed instructions to analyze each of the plurality of feasible paths based on a plurality of data conditions to identify a security vulnerability associated with the security-sensitive variable using a path based security guarantee model.

In yet another aspect, a computer program product including a non-transitory computer-readable medium having embodied therein a computer program for identifying security vulnerabilities is provided. The computer readable program, when executed on a computing device, causes the computing device to receive a security-sensitive variable, wherein a source code associated with the security-sensitive variable is represented in the form of a System Dependence Graph (SDG). Further, the computer readable program, when executed on a computing device, causes the computing device to obtain a plurality of forward function nodes associated with the security-sensitive variable by performing a forward slicing on the SDG. Further, the computer readable program, when executed on a computing device, causes the computing device to obtain a plurality of security parameters associated with the security-sensitive variable from the SDG. Further, the computer readable program, when executed on a computing device, causes the computing device to obtain a plurality of backward function nodes corresponding to the plurality of security parameters by performing a backward slicing on the SDG Further, the computer readable program, when executed on a computing device, causes the computing device to obtain a plurality of matching function nodes by comparing the plurality of forward functions nodes and the plurality of backward function nodes. Further, the computer readable program, when executed on a computing device, causes the computing device to enumerate a plurality of directed paths based on the plurality of matching function nodes using a Depth First Search (DFS) with backtracking. Further, the computer readable program, when executed on a computing device, causes the computing device to evaluate a path condition associated with each function node of each of the plurality of enumerated directed paths to obtain a plurality of feasible paths, wherein the enumerated path is feasible only if the path condition associated with each function node is evaluated. Finally, the computer readable program, when executed on a computing device, causes the computing device to analyze each of the plurality of feasible paths based on a plurality of data conditions to identify a security vulnerability associated with the security-sensitive variable using a path-based security guarantee model.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
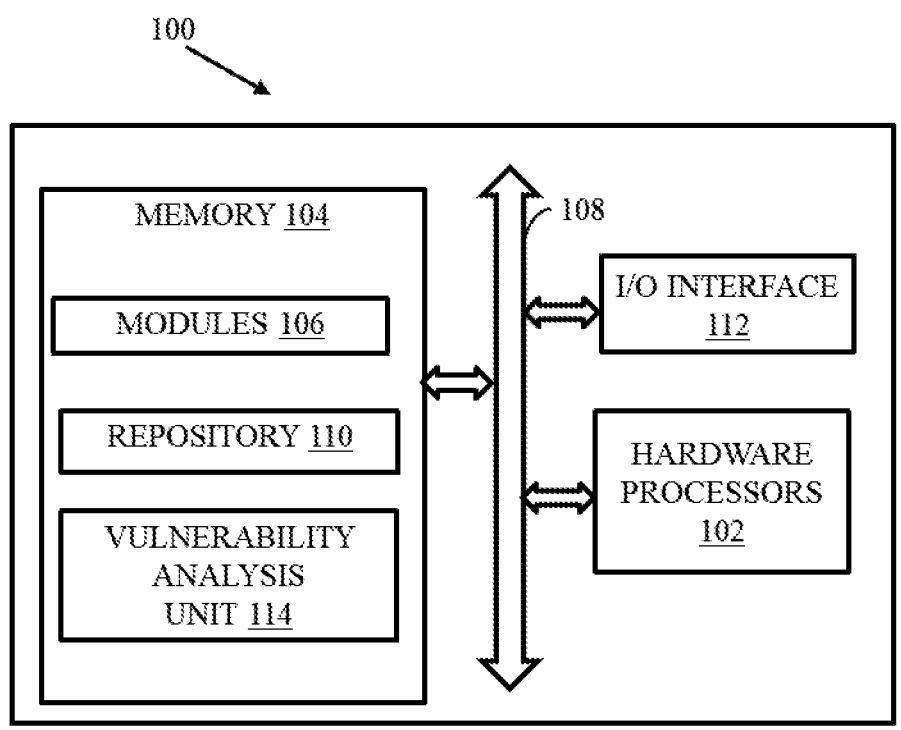
FIG. 1 is a functional block diagram of a system for identifying security vulnerabilities, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Embodiments herein provide a method and system for identifying security vulnerabilities. The method and system identify a security vulnerability associated with a security-sensitive variable by analyzing a source code of an application. Here, the analysis is performed based on a System Dependence Graph (SDG) associated with the source code of the application. Initially, the security-sensitive variable and the corresponding source code of the application is received. The source code is represented as the SDG. Forward slicing is performed on the SDG to obtain a plurality of forward function nodes. Further, a plurality of security parameters associated with the security-sensitive variable are obtained. Further, a backward slicing is performed based on a plurality of security parameters to obtain a plurality of backward function nodes. Further, a plurality of common function nodes are obtained from the plurality of forward and the backward function nodes. The plurality common function nodes are utilized to generate a plurality of enumerated paths. The enumerated paths are further evaluated to obtain a plurality of feasible paths. The plurality of feasible paths are further analyzed to identify any security vulnerability associated with the security-sensitive variable.

Referring now to the drawings, and more particularly to FIGS. 1 through 5, where similar reference characters denote corresponding features consistently throughout the figures, there are shown preferred embodiments and these embodiments are described in the context of the following exemplary system and/or method.

FIG. 1 is a functional block diagram of a system 100 for identifying security vulnerabilities, according to some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting a number of computing systems with one another or to another server computer. The I/O interface 112 may include one or more ports for connecting a number of devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106 and a vulnerability analysis unit 114. The memory 104 also includes a data repository (or repository) 110 for storing data processed, received, and generated by the plurality of modules 106 and the vulnerability analysis unit 114.

The plurality of modules 106 include programs or coded instructions that supplement applications or functions performed by the system 100 for identifying security vulnerabilities. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for identifying security vulnerabilities.

The data repository (or repository) 110 may include a plurality of abstracted piece of code for refinement and data that is processed, received, or generated as a result of the execution of the plurality of modules in the module(s) 106 and the modules associated with vulnerability analysis unit 114. In an embodiment, modules such as SDG creator module, a slicer module, a path enumerator module, a path evaluator module and a vulnerability report generation module are present inside vulnerability analysis unit 114. The data repository may also include the SDG and program code associated with the method for identifying security vulnerabilities.

Although the data repository 110 is shown internal to the system 100, it will be noted that, in alternate embodiments, the data repository 110 can also be implemented external to the system 100, where the data repository 110 may be stored within a database (not shown in FIG. 1) communicatively coupled to the system 100. The data contained within such external database may be periodically updated. For example, new data may be added into the database (not shown in FIG. 1) and/or existing data may be modified and/or non-useful data may be deleted from the database (not shown in FIG. 1). In one example, the data may be stored in an external system, such as a Lightweight Directory Access Protocol (LDAP) directory and a Relational Database Management System (RDBMS).

Figure 2A:
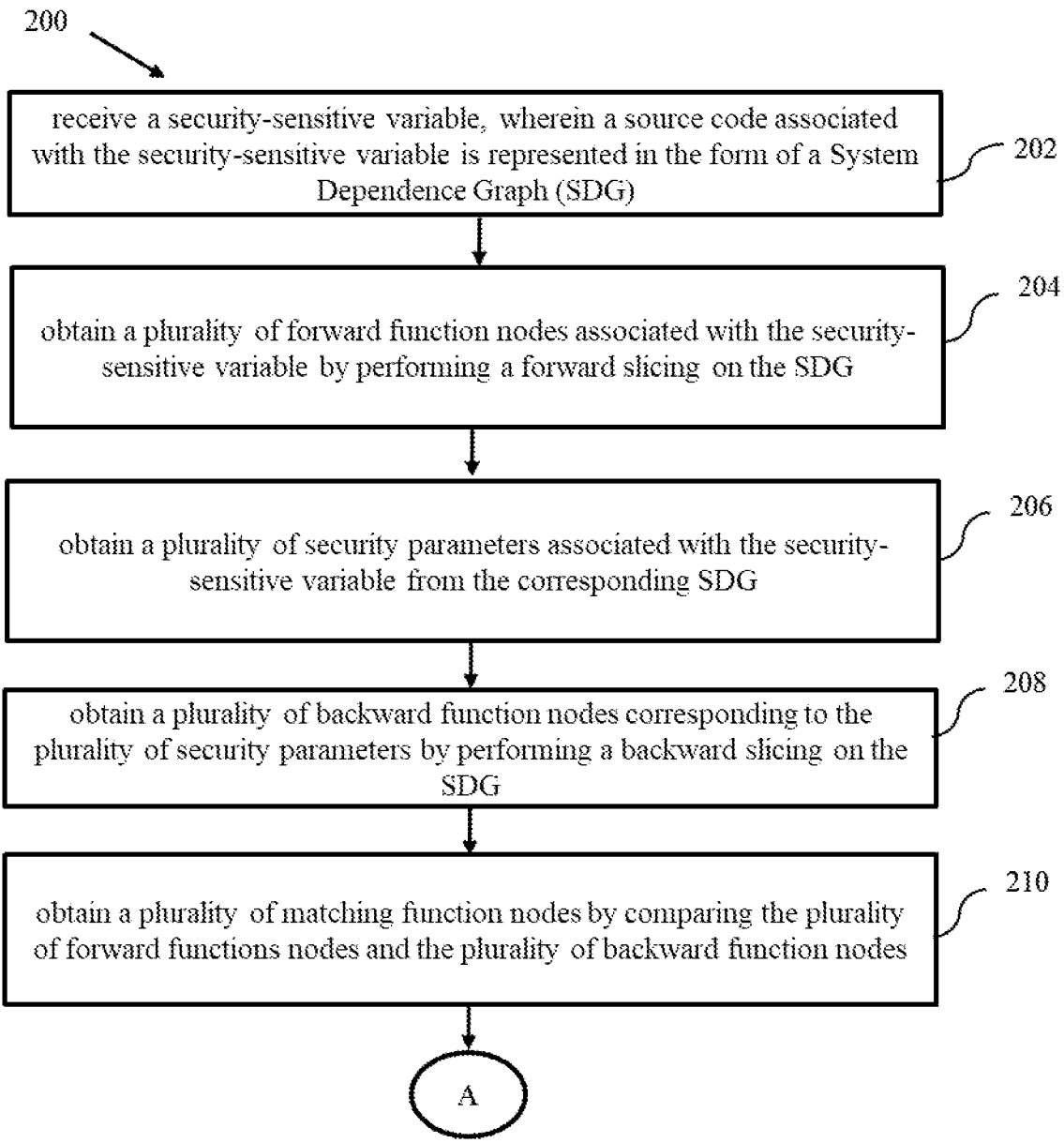
FIGS. 2A and 2B are exemplary flow diagrams for a method for identifying security vulnerabilities, implemented by the system of FIG. 1, in accordance with some embodiments of the present disclosure.
Figure 2B:
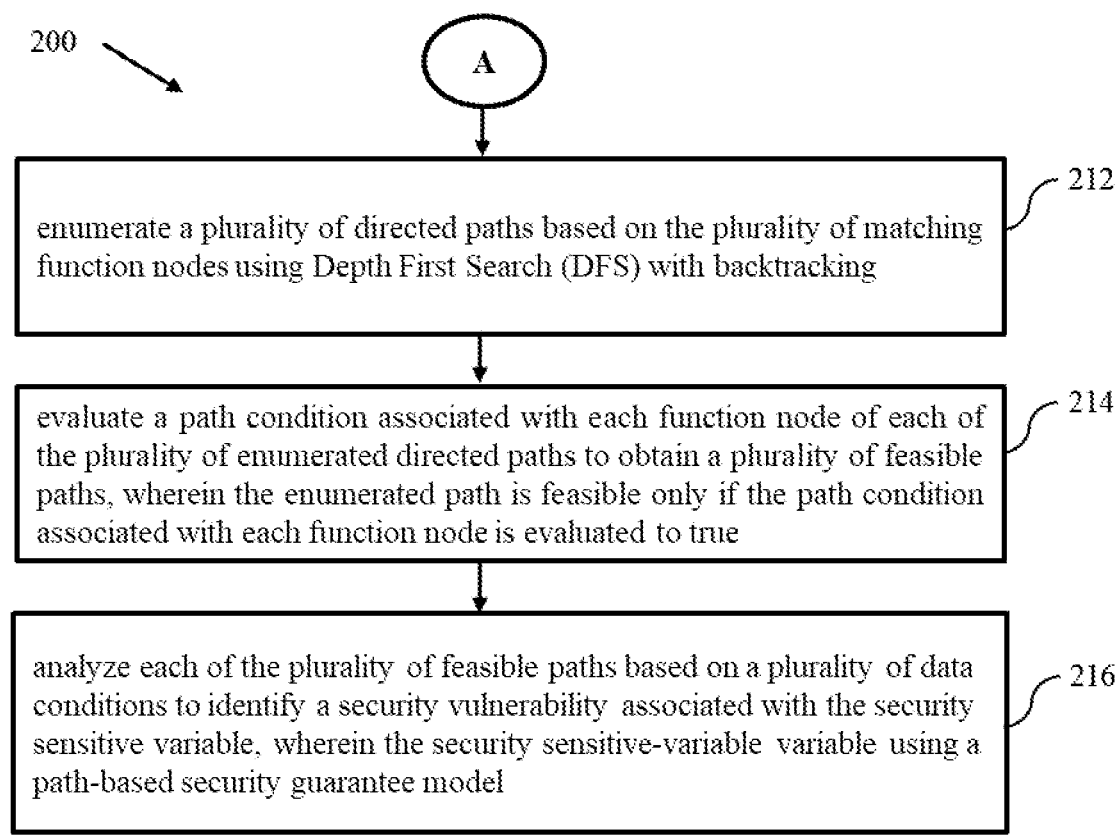

FIGS. 2A and 2B are exemplary flow diagrams for a processor implemented method for identifying security vulnerabilities implemented by the system of FIG. 1 according to some embodiments of the present disclosure. In an embodiment, the system 100 includes one or more data storage devices or the memory 104 operatively coupled to the one or more hardware processor(s) 102 and is configured to store instructions for execution of steps of the method 200 by the one or more hardware processors 102. The steps of the method 200 of the present disclosure will now be explained with reference to the components or blocks of the system 100 as depicted in FIG. 1 and the steps of flow diagram as depicted in FIG. 2A and FIG. 2B. The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communication network. The order in which the method 200 is described is not intended to be construed as a limitation, and any number of the described method blocks can be combined in any order to implement the method 200, or an alternative method. Furthermore, the method 200 can be implemented in any suitable hardware, software, firmware, or combination thereof.

At step 202 of the method 200, the one or more hardware processors 108 receive a security-sensitive variable, wherein a source code associated with the security sensitive variable is represented in the form of a System Dependence Graph (SDG). The security sensitive variable includes a password variable, an encryption key, an Electronic Code Book (ECB) mode, a 64-bit block cipher, a static Internet Protocol (IP), and a weak cryptographic algorithm.

For example, a plurality of vulnerabilities associated with storage of a password variable are storage of passwords in plaintext, protecting the passwords with an insecure hash function, logging of plaintext passwords in a log file, a minimum number of iterations while encrypting passwords, no salt variable, and a static salt variable.

For example, a plurality of vulnerabilities associated with the encryption key are usage of static encryption key.

For example, a plurality of vulnerabilities associated with the ECB mode are ECB mode in symmetric cryptography and symmetric mode of AES.

For example, a plurality of vulnerabilities associated with the 64-bit block cipher are using symmetric block ciphers including Data Encryption Standard (DES), 3DES, International Data Encryption Algorithm (IDEA) and Blowfish For example, a plurality of vulnerabilities associated with the static Initialization Vector (IV) are usage of static IVs.

For example, a plurality of vulnerabilities associated with the weak cryptographic algorithm are usage of Secure Hash Algorithm (SHA) 1, Message Digest (MD) 5, MD4, MD2 and the like.

The SDG comprises a plurality of Program Dependence Graph (PDG) corresponding to each function associated with the source code, wherein each node of the PDG represents a program statement and each edge of the PDG represents one of, a data flow edge and a control flow edge. The SDG includes a plurality of function nodes and a plurality of edges connecting the plurality of function nodes based on a caller-callee relationship. The plurality of edges comprises a plurality of parameter in edges, a plurality of parameter out edges, a plurality of call edges, and a plurality of summary edges.

At step 204 of the method 200, the one or more hardware processors 102 obtain a plurality of forward function nodes associated with the security-sensitive variable by performing a forward slicing on the SDG. The forward function nodes include a plurality of forward data flow nodes and a plurality of forward control flow nodes of the SDG, capturing the flow of the security-sensitive variable between a variable definition till and end of usage of the security-sensitive variable in the source code of the application. For example, to identify the password variables in Java applications, the information flow is captured from the user interface to Java classes which encapsulates the business logic.

Slicing is a technique to extract relevant program points that influence or are influenced by a program variable. Typically, a slice is computed with respect to a slicing criterion <s;v>, which specifies a program statement (s) and a variable (v). Slicing is a flow-sensitive approach that extracts those program statements of an application which potentially affect or are affected by the variable v of the program statement s. Two popular slicing approaches used in practice are forward slicing and backward slicing.

Slicing produces a flow and context-sensitive output. A path-sensitive analysis tracks data flow fact depending on the path taken which is created due to the presence of conditional statements. It is more precise than flow-sensitive analysis, but it is computationally expensive.

At step 206 of the method 200, the one or more hardware processors 108 obtain a plurality of security parameters associated with the security-sensitive variable from the corresponding SDG. The plurality of security parameters includes, but not limited to, a salt variable, an iteration count, and a key length.

At step 208 of the method 200, the one or more hardware processors 102 obtain a plurality of backward function nodes corresponding to the plurality of security parameters by performing a backward slicing on the SDG. The backward function nodes include a plurality of backward data flow nodes and a plurality of backward control flow nodes associated with the SDG corresponding to each of the plurality of security parameters.

At step 210 of the method 200, the one or more hardware processors 102 obtain a plurality of matching function nodes by comparing the plurality of forward functions nodes and the plurality of backward function nodes. For example, the matching function nodes are the nodes which appear in both on the plurality of forward functions nodes and the plurality of backward function nodes.

At step 212 of the method 200, the one or more hardware processors 102 enumerate a plurality of directed paths based on the plurality of matching function nodes using Depth First Search (DFS) with backtracking.

At step 214 of the method 200, the one or more hardware processors 102 evaluate a path condition associated with each function node of each of the plurality of enumerated directed paths to obtain a plurality of feasible paths. The enumerated path is feasible only if the path condition associated with each function node is evaluated to true. The plurality of path conditions includes a plurality of control predicate over a program variable necessary to influence the execution of that path.

In an embodiment, the method of evaluating the path condition associated with each function node of an enumerated path is explained below. The evaluation starts from an initial node of a selected enumerated path. Initially, a type of an initial function node associated with the enumerated path is identified. The type can be a predicate node or an entry node or an exit node or a parameter node or an assignment node or an identity node or an invoke node. If the type of the initial node is a predicate node, then a conditional expression corresponding to the initial function node obtained, and a plurality of operands associated with the conditional expression are extracted. The conditional expression is evaluated when each of the plurality of operands associated with the conditional expression are constant values. If the plurality of operands associated with the expression are not constant values, a definition corresponding to each of the plurality of operands are obtained recursively by traversing the path in the backward direction until a corresponding constant value is obtained. The definition is marked as undefined when the constant value is not found. Finally, the evaluated conditional expression is tagged to the predicate node. Each of the plurality of function nodes associated with the corresponding enumerated path is evaluated sequentially using the above-said method. The evaluation is stopped if at least one function node is identified as having an undefined definition.

Figure 4:
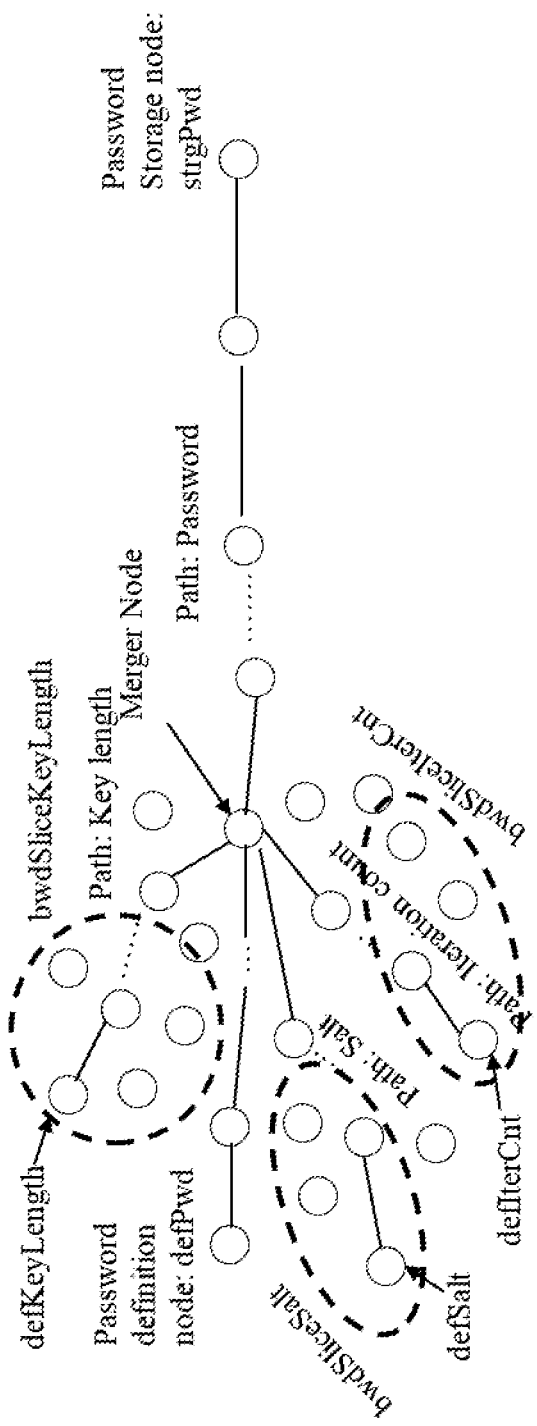
FIG. 4 is an example path-based security guarantee model associated with the source code of an application, implemented by the system of FIG. 1, in accordance with some embodiments of the present disclosure.

At step 216 of the method 200, the one or more hardware processors 102 analyze each of the plurality of feasible paths based on a plurality of data conditions to identify a security vulnerability associated with the security sensitive variable using a path based security guarantee model as explained in FIG. 4.

In an embodiment, the method of analyzing each of the plurality of feasible paths based on a plurality of data conditions to identify a security vulnerability associated with the security-sensitive variable is explained below: Initially, the plurality of data conditions corresponding to each of the plurality of feasible paths are obtained. In an example embodiment, the plurality of data conditions includes the salt, the iteration count, and the key length associated with the plurality of backward function nodes. Further, a value associated with each of the plurality of data conditions corresponding to each of the plurality of feasible paths is compared with a corresponding predetermined value. Finally, a feasible path is identified as a secure path when the value of each of the plurality of data conditions is greater than the predetermined value.

The vulnerability analysis unit 114, when executed by one or more processors of the system 100 receives the security-sensitive variable, wherein the source code associated with the security-sensitive variable is represented in the form of the System Dependence Graph (SDG). The security sensitive variable includes the password variable, the encryption key, the Electronic Code Book (ECB) mode, Cipher Block Chaining (CBC) mode, the 64-bit block cipher, the static IV, and the weak cryptographic algorithm.

The SDG comprises the plurality of Program Dependence Graph (PDG) corresponding to each function associated with the source code. Each node of the PDG represents the program statement and each edge of the PDG represents one of, a data flow edge and a control flow edge. The SDG includes the plurality of function nodes and the plurality of edges connecting the plurality of function nodes based on the caller-callee relationship. The plurality of edges includes the plurality of parameter in edges, the plurality of parameter out edges, the plurality of call edges, and the plurality of summary edges.

In an embodiment, a password variable within an application is obtained using a method is described further with reference to Pseudocode 1.

Pseudocode 1:
Function identifyPasswordProcessingFiles (pathToApplicationRootDirectory) pathToApplicationRootDirectory: Web application directory path
    a. files=retrieve all JSP and HTML files within the application
    b. actions=empty
    c. classes=empty
    1. for each fin files do
    2. use RE to search file f for password fields enclosed within <form> and </form> tags.
        if a match is found then extract the action attribute of form tag and store
        it in URL
    3. if URL does not exists in actions then
        parse web.xml file and extract servlet classes
        find servlet class responsible for processing URL
        retrieve struts-config files from web.xml
        parse struts-config files and extract struts classes
        determine struts class responsible for handling URL
    4. classes:add(class)
    5. actions.add(URL)
    6. end if
    7. end for
    8. return classes—Set of Java classes that process password Variable The first step is to identify password fields within the result pages (e.g., JSP, HTML). The password fields are typically enclosed within the form tag which can be extracted using a regular expression. The action attribute of the form tag specifies the Uniform Resource Locator (URL) pattern which maps to an action class. Whenever a client machine submits a form containing a password, the appropriate action class is invoked by the Struts framework. The mapping between URL patterns and Java classes is defined in the web.xml configuration file. If the Java class is a struts action class, then the mapping is defined in one of the struts configurations files. These XML files are parsed and the relevant Java class that processes the given action URL (and hence the password field within the form) are extracted. An exemplary regular expression to extract the value of form action attribute from JSP tags, HTML tags, and velocity tags is given below.
<[a-z]*form.*?action\s*=\s*"(.*?)
"*>.*?=\s*"password".*?</[a-z]*form>

Once the candidate Java classes are extracted, the present disclosure combines regular expression based approach to extract slicing criteria (e.g., HttpServletRequest.getParameter in Servlet, ActionForm in struts framework, PortletRequest.getParameter, command-line arguments in Java main method, etc.).

Figure 3A:
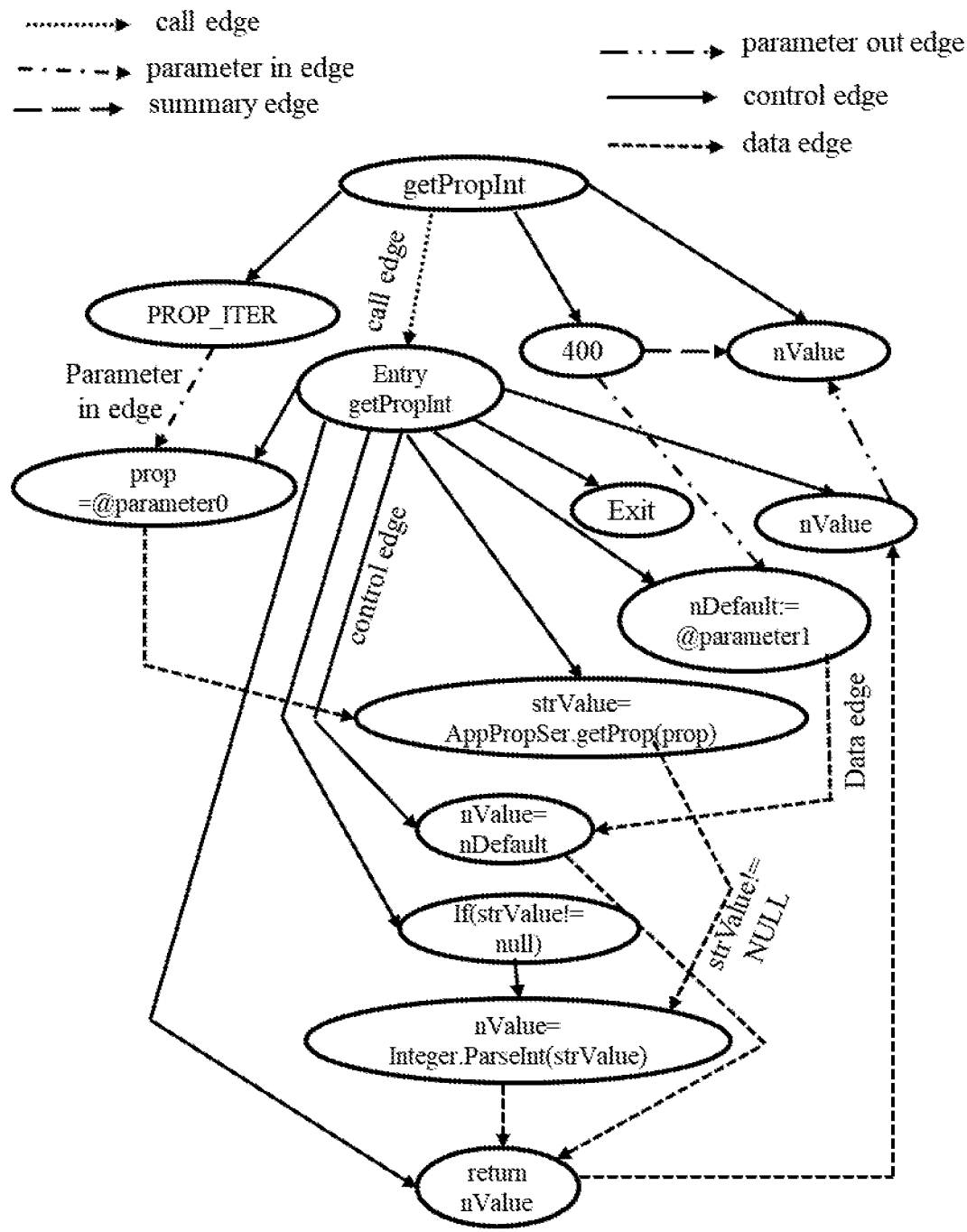
FIGS. 3A, 3B, and 3C illustrate a portion of an example System Dependence Graph (SDG) and feasible paths associated with a source code of an application, implemented by the system of FIG. 1, in accordance with some embodiments of the present disclosure.
Figure 3B:
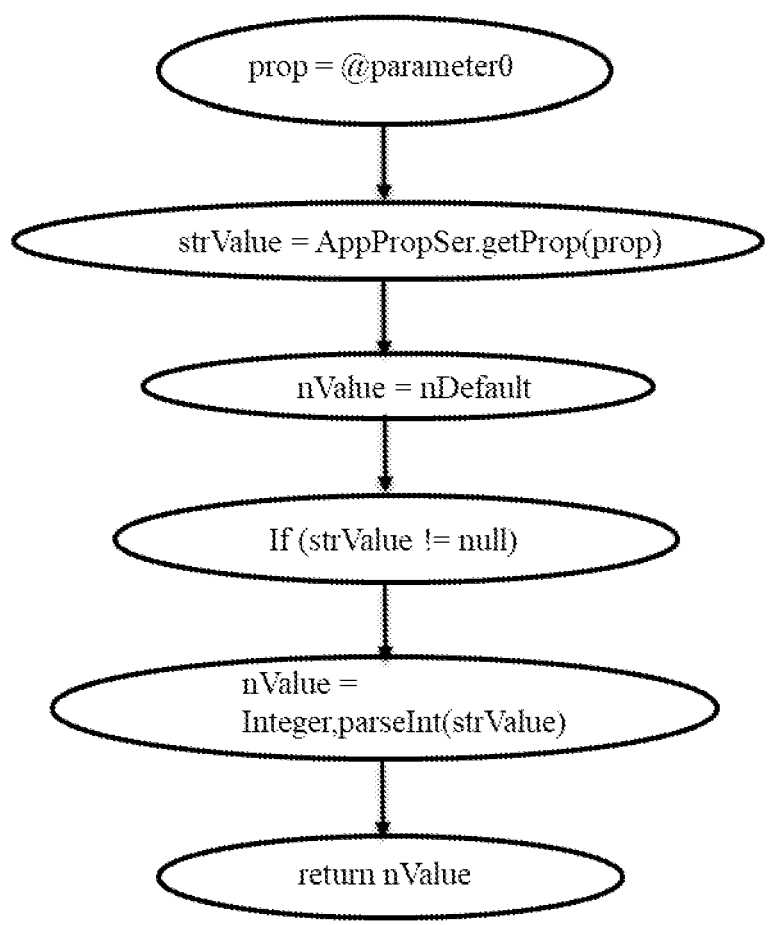
Figure 3C:
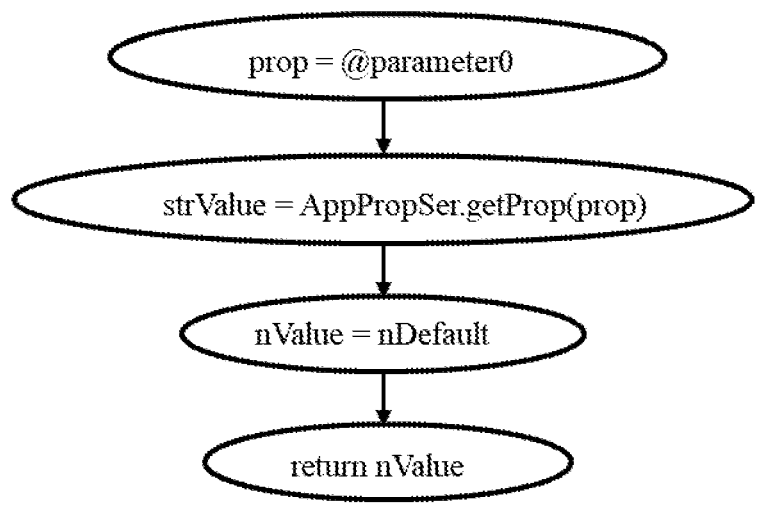

FIGS. 3A, 3B, and 3C illustrate a portion of an example System Dependence Graph (SDG) and feasible paths associated with the source code of the application implemented by the system of FIG. 1, in accordance with some embodiments of the present disclosure.

In an embodiment, an example source code shown in Table 1 is as given below:

TABLE 1

Example Source Code

| 1 | _iterations = AppPropSer.getPropInt(PROP_ITER, 400); |
| 2 | password[ ] = strPassword.toCharArray( ); |

TABLE 1-continued

Example Source Code

| 3 | int newHashLen = hashLength*8; |
| 4 | PBEKeySpec spec = new PBEKeySpec(password[ ], _salt, _iterations, newHashLen); |
| 5 | public int getPropInt(String prop, int nDefault) |
| 6 | { |
| 7 |   String strValue = AppPropSer.getProp(prop); |
| 8 |   int nValue = nDefault; |
| 9 |   if (strValue != null) |
| 10 |   { |
| 11 |     nValue = Integer.parseInt(strValue); |
| 12 |   } |
| 13 |   return nValue; |
| 14 | } |

FIG. 3A illustrates the portion of the SDG for the example source code as shown in Table1. Now referring to FIG. 3A, the SDG includes the plurality of function nodes and the plurality of edges. Here, the function node is "getPropInt". The node "getPropInt" and the node "Entry getPropInt" are connected by a call edge. The nodes "PROP_ITER" and "prop=@parameter0" are connected by a parameter in edge. The nodes "400" and "nvalue" are connected by the summary edge. The node "Entry getPropInt" is connected to a plurality nodes including "prop=@parameter0", "exit", "nvalue", "nDefault=@parameter1", "if(strValue!=null)", "strValue=AppPropSer.getProp(prop)", "nvalue=nDefault", "nValue=Integer.ParseInt(strValue)" and "return nvalue" using the plurality of control edges. The node "return nValue" is connected to the node "nValue" by using the data edge. The node "nDefault=@parameter1" is connected to the node "nvalue=nDefault" by the data edge and the like.

As shown the example source code in Table 1, the function getPropInt takes the name of a property and integer value and computes the value of iteration count to be used for calculating the hash value of a password (lines 1-4). The function is called with property name PROP_ITER and the default value 400 (line 1). The function assigns the default value of iteration count (passed as a parameter) to nValue (line 8). Subsequently, it checks for the existence of PROP_ITER in the property file (line 9) and overwrites nValue with the corresponding value (line 9). Finally, the function returns the computed iteration count (line 13). Thus, function getPropInt computes (weak) iteration count in one branch (default value 400) and (probably) strong value over another branch depending on the existence of the value of iteration count in a property file. Subsequently, the caller of the getPropInt function (line 1) uses the iteration count to create an instance of PBEKeySpec (PBKDF2 hash). A weak value of iteration count (<10,000 as per NIST) leads to computation of weak hash value for the password (line 4).

The present disclosure computes SDG for an application that captures the transitive dependency through summary edges between actual parameters at call-site. As shown in FIG. 3B, two data dependencies for the iteration count (return nValue) are captured in SDG and considered while enumerating paths (as shown in FIG. 3C) for the actual out parameter (nValue at call-site of getPropInt).

In an embodiment, pseudocode to compute storage vulnerability of a password variable is described further with reference to Pseudocode 2:

Pseudocode 2: Function detectSecurityVulnerability(SDG)
Input: SDG of the application

```
SGD: System Dependence Graph of an application
   1.   logicalEndPoints = empty, fwdSliceSet = empty, bwdSliceSet = empty
   2.   pathsSet = empty, cryptoAPISet = empty
   3.   fwdSlicingCriteria = extractSlicingCriteria( )
                --Extracts slicing criteria  from an application using pattern
        matching
   4.   for each criteria c in fwdSlicingCriteria do
   5.      fwdSlice = computeForwardSlice(c)       --Compute forward
        slice
   6.      fwdSliceSet.add(fwdSlice)
                -- add computed forward slice into fwdSliceSet
   7.   end for
   8.   for each f c in fwdSliceSet do
   9.      methods = extractMethods(fc)
                --Extract method of SDG through which slice given as a
        parameter passes
   10.     logicalEndPoints = getLogicalEndPoints(fc)
                --Extract logical endpoint from slice using pattern matching
        (database, log)
   11.     for each lep in logicalEndPoints do
   12.        for each m in methods do
   13.           paths = enumeratePaths(m,lep)
                   --Enumerates all paths terminating in a logical endpoint or a
           backward slice criterion
   14.           pathSet.add(paths)
                   --Add enumerated path into pathsSet
   15.           if matchesCryptoAPIs(m) then
                   --Checks whether method passed as parameter, is a
        cryptographic API
   16.              cryptoAPISet.add(m)
                      --Add and Collect Crypto API methods
   17.           end if
   18.        end for
   19.           pathSet = mergePaths(methods, pathSet)
                   --Merge paths at callsites
   20.     end for
   21.  end for
   22.  bwdSlicingCriteria = genBwdSlicingCriteria(cryptoAPISet)
                --Generate slicing criteria to compute backward slices for
        security parameter & user-supplied function(PBEKeySpec)
   23.  for each c in bwdSlicingCriteria do
   24.     bwdSlice = computeBackwardSlice(c)
                --Computes backwardslicing
   25.     bwdSliceSet = bwdSliceSet.add(bwdSlice)
   26.  end for
   27.  for each bc in bwdSliceSet do
   28.     methods = extractMethods(bc)
                --Extract logical endpoint from slice pattern matching (e.g.,
        database, log)
   29.     for each m in methods do
   30.        paths = enumeratePaths(m,bc)
                   --Enumerate all paths terminating in logical end point or a
        backward slice criterion
   31.        pathsSet.add(paths)
                   --Add paths into pathsSet
   32.     end for
   33.     pathsSet = mergePaths(methods,pathsSet
                --Merge paths at call-sites
   34.     taggedVars = analyzeAndTagVariables(bc)
                --Analyze variables occurring in a backward slice
   35.     mappedPaths = mapVariablesOntoPaths(taggedVars,bc,pathsSet)
                --Map variables onto paths during the processing of forward
        slices at line 18 and 22
   36.  end for
   37.  for each path in mappedPaths do
   38.     computeSecurityGuarantee(path)
                --Compute security guarantee for the path given as input
   39.  end for
```

Now referring to pseudocode 2, the procedure extractSlicingCriteria extracts slicing criteria from an application using pattern matching. The procedure computeForwardSlice computes forward slice using the HRB algorithm. The procedure extractMethods extracts methods of SDG through which slice, given as a parameter passes. The procedure getLogicalEndPoints extracts logical endpoints from a slice using pattern matching (e.g., database, log). The procedure enumeratePaths enumerate all paths terminating in a logical endpoint or a backward slice criterion. The procedure matchesCryptoAPIs checks whether the method passed as a parameter is a cryptographic API. The procedure mergePaths Merges paths at call-sites. The procedure genBwdSlicingCriteria generates slicing criteria to compute backward slices for password parameters and user-supplied functions (e.g., PBEKeySpec). The procedure compute- BackwardSlice computes a backward slice using the HRB algorithm. The procedure analyzeAndTagVariables analyzes variables occurring in a backward slice. The procedure mapVariablesOntoPaths maps variables onto the paths enumerated during processing of forward slices. The procedure computeSecurityGuarantee computes security guarantee for the path given as input.

The HRB algorithm is described further with reference to Pseudocode 3.

```
Pseudocode 3: Function computeSlice(SDG, CL)
        SDG: System Dependence Graph of an application
        CL: A Set of Slicing Criterion for a security-sensitive variable
    a)     slice = empty                    -- slice consists of SDG slice nodes
    b)     WLup = empty                     -- Marked node to process during the first
           pass
    c)     WLdown = empty                   -- Marked node to process during the
           second pass
    1.     slice.add(CL)                    -- put the sliceCriterion into S and WLup
    2.     WLup.add(CL)
    3.     While WLup is not empty do {
                                            -- First Pass: Slicing without
           descending into
                                            called functions
    4.         WLup.remove(n)               -- remove a node n from WLup
    5.         E = SDG.getEdges(n)          -- get all edges as source edges from SDG
    6.         for each edge in E do {
    7.             if edge target node, m not exist in slice then
    8.                 if edge type is parameter-out edge then
    13.                    slice.add(m)     -- put the destination/target node m into
    slice
    14.                    WLdown.add(m)         and WLdown
    15.                else
    16.                    slice.add(m)     -- put the destination/target node m into
    slice
    17.                    WLup.add(m)           and WLup
    18.                end if
    19.            end if
    20.        } end for
    21     } end while
    22.    While WLdown is not empty do {
    23.        WLdown.remove(n)                  -- remove a node n from WLdown
    24.        for each edge in E do {
    25.            if edge target node, m not exist in slice then
    26.                if edge type is not parameter-in edge or call edge then
    27.                    WLdown.add(m)    -- put the desitnation/target node m
           into the
    28.                    slice.add(m)          slice and WLdown
    29.                end if
    30.            end if
    31.        } end for
    32     } end while
    33.    return slice                     -- slice consist of SDG slice nodes
```

The pseudocode 3 for the HRB slicing algorithm is executed in two passes. The HRB algorithm receives the SDG of application and slicing criterion as inputs and computes a slice for the slicing criterion.

The vulnerability analysis unit 114, when executed by one or more hardware processors 102 of the system 100 obtain the plurality of forward function nodes associated with the security-sensitive variable by performing the forward slicing on the SDG. The forward function nodes include the plurality of forward data flow nodes and the plurality of forward control flow nodes of the SDG, capturing the flow of the security-sensitive variable between the definition till and end of usage of the security-sensitive variable in the source code.

The forward slicing for the password variable achieves two goals: i) it identifies logical endpoint for the information flow related to a password and ii) it identifies methods through which the password variable flows. However, it does not provide any information about how the password variable is processed with regards to the other pieces of information such as salt, key length, and iteration count. The values of salt, key length and iteration count play an important role in generating a secure hash value for the password.

The vulnerability analysis unit 114, when executed by one or more hardware processors 102 of the system 100 obtain the plurality of security parameters associated with the security sensitive variable from the corresponding SDG. The plurality of security parameters includes the salt variable, the iteration count, and the key length.

The vulnerability analysis unit 114, when executed by one or more hardware processors 102 of the system 100 obtain the plurality of backward function nodes corresponding to the plurality of security parameters by computing the backward slicing on the SDG. The backward function nodes include the plurality of backward data flow nodes and the plurality of backward control flow nodes associated with the SDG corresponding to each of the plurality of security parameters.

The vulnerability analysis unit 114, when executed by one or more hardware processors 102 of the system 100 obtain the plurality of matching function nodes by comparing the plurality of forward functions nodes and the plurality of backward function nodes.

The vulnerability analysis unit 114, when executed by one or more hardware processors 102 of the system 100 enumerates the plurality of directed paths based on the plurality of matching function nodes using Depth First Search (DFS) with backtracking.

To enumerate the plurality of paths, Pseudocode 2 first extracts all methods from the SDG whose nodes are in the forward slice (line 9) and the backward slices (line 28). As the enumeration of paths is computationally expensive, the algorithm does path enumeration for only those methods that appear in forward slice and backward slice which typically constitutes a tiny fraction of the entire application. Once the methods for path enumeration are extracted, Pseudocode 2 obtains directed graph for each function node. Pseudocode 2 uses Depth First Search (DFS) with backtracking to enumerate all paths for a given function in the forward slice (line 13) as well as backward slice (line 30). The enumerated paths are combined at the call sites if the caller-callee relationship exists between methods (lines 19, 33).

Enumeration of paths is described further with reference to Pseudocode 4. Post enumeration of paths of all extracted methods, they are combined at call-sites to generate paths across methods.

```
Pseudocode 4: Function enumeratePaths(dg)
Input: G = (N;E) directed graph dg of method
  dg: Directed Graph dg of method
  1.  path_list = empty              --A list of all paths of method
  2.  path = empty                   --Marked node to process during
                                       first pass
  3.  head = dg.getHeadNode( )
      path.add(head)                 -- Add head node as start
      node
  5.  EnumeratePath(head, path)
  6.  return path_list
  7.  function enumeratePath(head, path)
  8.    if dg.getSucc(head) is null then   --If no successor is present
  9.      Path_list = path_list.add(path)
  10.     return
  11.   else if all the successors of head are Visited then
  12.     path_list.add(path)
  13.     return
  14.   else
  15.     for each successor succ of the head node do
  16.       path.add(head)
  17.       EnumeratePath(succ, path)
  18.     end for
  19.   end if
  20. end function enumeratePath
  21. return path_list                 -- path list a list of all paths of
      method
```

The vulnerability analysis unit 114, when executed by one or more hardware processors 102 of the system 100 evaluates the path condition associated with each function node of each of the plurality of enumerated directed paths to obtain the plurality of feasible paths. The enumerated path is feasible only if the path condition associated with each function node is evaluated. The plurality of path conditions includes the plurality of control predicate over the program variable necessary to influence.

In an embodiment, the method of evaluating the path condition associated with each function node of an enumerated path is explained below. The evaluation starts from the initial node of a selected enumerated path. Initially, the type of an initial function node associated with the enumerated path is identified. The type can be the predicate node or the entry node or the exit node or the parameter node or the assignment node or the identity node or the invoke node. If the type of the initial node is the predicate node, then the conditional expression corresponding to the initial function node is obtained, and the plurality of operands associated with the conditional expression are extracted. The conditional expression is evaluated when each of the plurality of operands associated with the conditional expression is constant values. If the operands associated with the expression are not constant values, the definition corresponding to each of the plurality of operands are obtained recursively by traversing the path in backward direction until the corresponding constant value is obtained. The definition is marked as undefined when the constant value is not found. Finally, the evaluated conditional expression is tagged to the predicate node. Each of the plurality of function nodes associated with the corresponding enumerated path is evaluated sequentially using the above said method. The evaluation is stopped if at least one function node is having an undefined definition.

To complete the security analysis and generate a guarantee for a password variable with respect to the secure storage, it is necessary to further analyze the backward slice computed for each relevant parameter of cryptographic API and map the result of analysis onto the enumerated paths. The analysis of backward slice includes whether the values assumed by password parameters such as salt, key length, and iteration count are insecurely chosen, weak default values, or securely generated in the application. Both, insecurely chosen and weak default values compromise the security of the password and therefore should be avoided.

The vulnerability analysis unit 114, when executed by one or more hardware processors 102 of the system 100 analyzes each of the plurality of feasible paths based on the plurality of data conditions to identify the security vulnerability associated with the security-sensitive variable using the path-based security guarantee model illustrated in FIG. 4.

FIG. 4 is the example path-based security guarantee model associated with the source code of an application implemented by the system of FIG. 1, in accordance with some embodiments of the present disclosure.

Now referring to FIG. 4, the proposed security guarantee model is associated with the password storage vulnerability which is given in pseudocode 2. To establish that the password storage is safe, it is to be checked whether the password variable always received a strong hash value on any given path. This is achieved by checking the plurality of path conditions associated with a given path.

A security guarantee model should account for execution and data conditions for more precise security analysis. As discussed in the sample code as shown in Table 1, the sample code computes the default (insecure) value for the iteration count if the property file does not specify any (possibly strong) value for it. The check for the strValue program variable gives rise to two data conditions null and NOT null on two different paths and one execution condition if (strValue 1=null) (line 9 of the example sample code of Table 1. However, path condition based security guarantee model is more effective. A Path condition combines execution conditions and data conditions. Formally, path conditions over any path P are given by equation 1 where $E(p_i)$ captures the execution conditions for node $p_i$ attached to control dependency edges (shown in equation 2). An edge $D(P_i \rightarrow P_{i+1})$ represents data dependency constraints. Typically, data dependency edges capture def-use conditions but one can attach more data conditions to them. As shown in the example sample code of Table 1, the data edge between strValue=AppPropSet.getProp(prop) and nValue=Integer.parseInt(strValue) PDG nodes is attached with strValue !=null condition. There could be multiple paths leading to an execution of a PDG node. A node will be executed if at least one path containing it gets executed. Equation 3 captures path conditions over multiple paths for a PDG node.

$$PC(P) = \Lambda_{i=1}^{n} E(P_i) \Lambda \Lambda_{i=1}^{n-1} D(P_i \rightarrow P_{i=1}) \quad (1)$$

$$E(P_j) = \Lambda_{i=1}^{J-1}(P_i \rightarrow P_{i+1}) \quad (2)$$

$$MP(\varphi = \Lambda_{P \in p} PC(P) \quad (3)$$

In an embodiment, the Security guarantee for the password variable requires to account for an independent origin of password parameters. Equation 3 captures path conditions over a set of paths (p). As shown in FIG. 4, there are independent paths for each password parameter. They are merged at the PDG node $P_{merger}$. To capture a security guarantee for the password, the system divides each password parameter path into two paths. The first parameter path is from the definition of password parameter (def nodes) up to merger node. The second parameter path is from the merger node up to the password storage node. Path conditions for iteration count, key length, and salt (first parameters paths) are given by equations 4, 5, and 6. To simplify the equations, the system excludes control conditions. Equations 4, 5, and 6 capture the security constraints for password storage whereas per OWASP and NIST recommendations IC=10,000, KL=256 bits and SL=128 bits. They are combined at the merger node. Merger node inherits the security constraints attached to each password parameter path. The second path from the merger node up to the storage node has all three constraints and is given by equation 7.

$$PC(P_{itercount}^{1}) = \Lambda_{i=defIterCnt}^{pmerger}(\text{IterCnt} \geq IC \in D \\ (P_i \rightarrow P_{i+1})) \quad (4)$$

$$PC(P_{keylen}^{1}) = \Lambda_{i=defKeyLen}^{pmerger}(\text{keylength} \geq KL \varepsilon D \\ (P_i \rightarrow P_{i+1})). \quad (5)$$

$$PC(P_{salt}^{1}) = \Lambda_{i=defsalt}^{pmerger}(\text{salt-length} \geq SL \varepsilon D \\ (P_i \rightarrow P_{i=1})) \quad (6)$$

In an embodiment, the method of analyzing each of the plurality of feasible paths based on the plurality of data conditions to identify the security vulnerability associated with the security-sensitive variable is explained below: Initially, the plurality of data conditions corresponding to each of the plurality of feasible paths are obtained. The plurality of data conditions includes the salt, the iteration count, and the key length associated with the plurality of backward function nodes. Further, the value associated with each of the plurality of data conditions corresponding to each of the plurality of feasible paths is compared with the corresponding predetermined value. Finally, the feasible path is identified as the secure path when the value of each of the plurality of data conditions is greater than the predetermined value.

$$MPC(\varphi = (PC(P_{itercount}^{1}) \Lambda PC(P_{salt}^{1}) \Lambda PC(P_{keylen}^{1})) \quad (7)$$

Figure 5:
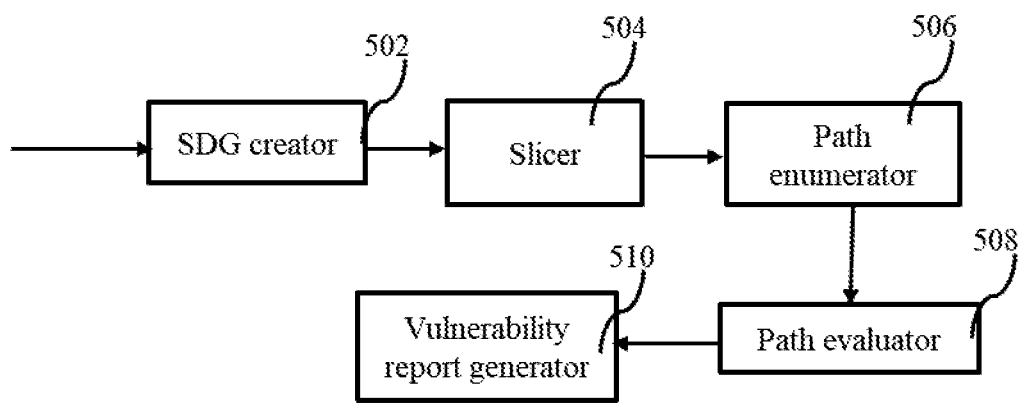
FIG. 5 illustrates an overall architecture illustrating the method for identifying security vulnerabilities, in accordance with some embodiments of the present disclosure.

FIG. 5 illustrates an overall architecture illustrating the method for identifying security vulnerabilities, in accordance with some embodiments of the present disclosure. Now referring to FIG. 5, the architecture includes an SDG creator module 502, a slicer module 504, a path enumerator module 506, a path evaluator module 508, and a vulnerability report generation module 510. The SDG creator module 502 generates the SDG for the given source code and the slice module 504 performs forward slicing and backward slicing on the SDG. The path enumerator module 506 enumerates the plurality of paths. The path evaluator module 508 evaluates the plurality of enumerated paths to obtain the plurality of feasible paths. The vulnerability report generation module 510 generates a vulnerability report corresponding to each of the plurality of feasible paths by analyzing the paths based on the plurality of security parameters including the salt, the key length, and the iteration count.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the unresolved problem of identifying security vulnerability of a security-sensitive variable. Here forward slicing and backward slicing are performed to enumerate the paths. Further, feasible paths are obtained from the evaluated enumerated paths and the feasible paths are further analyzed for identifying security vulnerability. Since the path enumeration is performed only on the common function nodes obtained from the forward slicing and the backward slicing, the computational complexity is reduced which further increases the efficiency of the system.

It is to be understood that the scope of the protection is extended to such a program and in addition to a computer-readable means having a message therein such computer-readable storage means contain program-code means for implementation of one or more steps of the method when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, the method comprising:
    receiving, by one or more hardware processors, a security-sensitive variable, wherein a source code associated with the security-sensitive variable is represented in the form of a System Dependence Graph (SDG);
    obtaining, by the one or more hardware processors, a plurality of forward function nodes associated with the security-sensitive variable by performing a forward slicing on the SDG;
    obtaining, by the one or more hardware processors, a plurality of security parameters associated with the security-sensitive variable from the SDG;
    obtaining, by the one or more hardware processors, a plurality of backward function nodes corresponding to the plurality of security parameters by performing a backward slicing on the SDG;
    obtaining, by the one or more hardware processors, a plurality of matching function nodes by comparing the plurality of forward functions nodes and the plurality of backward function nodes;
    enumerating, by the one or more hardware processors, a plurality of directed paths based on the plurality of matching function nodes using a Depth First Search (DFS) with backtracking;
    evaluating, by the one or more hardware processors, a path condition associated with each function node of each of the plurality of enumerated directed paths to obtain a plurality of feasible paths, wherein the enumerated path is feasible only if the path condition associated with each function node is evaluated to true, wherein the method of evaluating the path condition associated with each function node of an enumerated path comprising:
        identifying a type of an initial function node associated with the enumerated path, wherein the type comprises one of, a predicate node, an entry node, an exit node, a parameter node, an assignment node, an identity node and an invoke node;
        obtaining a conditional expression corresponding to the initial function node when the type of the function node is a predicate;
        extracting a plurality of operands associated with the conditional expression;
        evaluating the conditional expression when each of the plurality of operands associated with the conditional expression are constant values, wherein definition of each of the plurality of operands is obtained recursively by traversing the path in the backward direction until a corresponding constant value is obtained when the operands associated with the expression are not constant values, wherein the definition is marked as undefined when the constant value is not found; and
        tagging the evaluated conditional expression to the predicate node, wherein each of the plurality of function nodes associated with the corresponding enumerated path is evaluated sequentially using the said method, wherein the evaluation is stopped if at least one function node is having an undefined definition; and
    analyzing, by the one or more hardware processors, each of the plurality of feasible paths based on a plurality of data conditions to identify a security vulnerability associated with the security-sensitive variable using a path-based security guarantee model, wherein the method of analyzing each of the plurality of feasible paths based on a plurality of data conditions to identify a security vulnerability associated with the security-sensitive variable comprising:
        receiving the plurality of data conditions corresponding to each of the plurality of feasible paths, wherein the plurality of data conditions comprising the salt, the iteration count, and the key length associated with the plurality of backward function nodes;
        comparing a value associated with each of the plurality of data conditions corresponding to each of the plurality of feasible paths with a corresponding predetermined value; and
        identifying a feasible path as a secure path when the value of each of the plurality of data conditions is greater than the predetermined value, the path enumeration is performed only on common function nodes obtained from the forward slicing and the backward slicing enabling reduced computational complexity and increased efficiency of computer system.

2. The method of claim 1, wherein the security-sensitive variable comprises a password variable, an encryption key, an Electronic Code Book (ECB) mode, a 64-bit block cipher, a static IP, and a weak cryptographic algorithm.

3. The method of claim 1, wherein the SDG comprises a plurality of Program Dependence Graph (PDG) corresponding to each function associated with the source code, wherein each node of the PDG represents a program statement and each edge of the PDG represents one of, a data flow edge and a control flow edge.

4. The method of claim 1, wherein the SDG comprises a plurality of function nodes, and a plurality of edges connecting the plurality of function nodes based on a caller-callee relationship, wherein the plurality of edges comprises a plurality of parameter in edges, a plurality of parameter out edges, a plurality of call edges, and a plurality of summary edges.

5. The method of claim 1, wherein the forward function nodes comprise a plurality of forward data flow nodes and a plurality of forward control flow nodes of the SDG, capturing the flow of the security-sensitive variable between a definition till and end of usage of the security sensitive variable in the source code.

6. The method of claim 1, wherein the backward function nodes comprise a plurality of backward data flow nodes and a plurality of backward control flow nodes associated with the SDG corresponding to each of the plurality of security parameters.

7. The method of claim 1, wherein the path condition comprises a plurality of control predicate over a program variable necessary to influence, wherein the plurality of security parameters comprises a salt variable, an iteration count, and a key length.

8. A system comprising:
at least one memory storing programmed instructions; one or more Input/Output (I/O) interfaces; and one or more hardware processors operatively coupled to the at least one memory, wherein the one or more hardware processors are configured by the programmed instructions to:
receive a security-sensitive variable, wherein a source code associated with the security-sensitive variable is represented in the form of a System Dependence Graph (SDG);
obtain a plurality of forward function nodes associated with the security-sensitive variable by performing a forward slicing on the SDG;
obtain a plurality of security parameters associated with the security-sensitive variable from the SDG;
obtain a plurality of backward function nodes corresponding to the plurality of security parameters by performing a backward slicing on the SDG;
obtain a plurality of matching function nodes by comparing the plurality of forward functions nodes and the plurality of backward function nodes;
enumerate a plurality of directed paths based on the plurality of matching function nodes using a Depth First Search (DFS) with backtracking;
evaluate a path condition associated with each function node of each of the plurality of enumerated directed paths to obtain a plurality of feasible paths, wherein the enumerated path is feasible only if the path condition associated with each function node is evaluated to true, wherein the method of evaluating the path condition associated with each function node of an enumerated path comprising:
identifying a type of an initial function node associated with the enumerated path, wherein the type comprises one of, a predicate node, an entry node, an exit node, a parameter node, an assignment node, an identity node and an invoke node;
obtaining a conditional expression corresponding to the initial function node when the type of the function node is a predicate;
extracting a plurality of operands associated with the conditional expression;
evaluating the conditional expression when each of the plurality of operands associated with the conditional expression are constant values, wherein the definition of each of the plurality of operands is obtained recursively by traversing the path in the backward direction until a corresponding constant value is obtained when the operands associated with the expression are not constant values, wherein the definition is marked as undefined when the constant value is not found; and
tagging the evaluated conditional expression to the predicate node, wherein each of the plurality of function nodes associated with the corresponding enumerated path is evaluated sequentially using the said method, wherein the evaluation is stopped if at least one function node is having an undefined definition; and
identifying a security vulnerability associated with the security-sensitive variable by analyzing each of the plurality of feasible paths based on a plurality of data conditions by using a path-based security guarantee model, wherein identifying the security vulnerability associated with the security-sensitive variable by analyzing each of the plurality of feasible paths based on a plurality of data conditions comprises:
receiving the plurality of data conditions corresponding to each of the plurality of feasible paths, wherein the plurality of data conditions comprising the salt, the iteration count, and the key length associated with the plurality of backward function nodes;
comparing a value associated with each of the plurality of data conditions corresponding to each of the plurality of feasible paths with a corresponding predetermined value; and
identifying a feasible path as a secure path when the value of each of the plurality of data conditions is greater than the predetermined value, the path enumeration is performed only on common function nodes obtained from the forward slicing and the backward slicing enabling reduced computational complexity and increased efficiency of computer system.

9. The system of claim 8, wherein the security-sensitive variable comprises a password variable, an encryption key, an Electronic Code Book (ECB) mode, a 64-bit block cipher, a static IP, and a weak cryptographic algorithm.

10. The system of claim 8, wherein the SDG comprises a plurality of Program Dependence Graph (PDG) corresponding to each function associated with the source code, wherein each node of the PDG represents a program statement and each edge of the PDG represents one of, a data flow edge and a control flow edge.

11. The system of claim 8, wherein the SDG comprises a plurality of function nodes, and a plurality of edges connecting the plurality of function nodes based on a caller-callee relationship, wherein the plurality of edges comprises a plurality of parameter in edges, a plurality of parameter out edges, a plurality of call edges, and a plurality of summary edges.

12. The system of claim 8, wherein the forward function nodes comprise a plurality of forward data flow nodes and a plurality of forward control flow nodes of the SDG, capturing the flow of the security-sensitive variable between a definition till and end of usage of the security-sensitive variable in the source code.

13. The system of claim 8, wherein the backward function nodes comprise a plurality of backward data flow nodes and a plurality of backward control flow nodes associated with the SDG corresponding to each of the plurality of security parameters.

14. The system of claim 8, wherein the path condition comprises a plurality of control predicate over a program variable necessary to influence, wherein the plurality of security parameters comprises a salt variable, an iteration count, and a key length.

15. One or more non-transitory machine readable information storage mediums comprising one or more instructions which when executed by one or more hardware processors causes:

receiving, by the one or more hardware processors, a security-sensitive variable, wherein a source code associated with the security-sensitive variable is represented in the form of a System Dependence Graph (SDG);

obtaining, by the one or more hardware processors, a plurality of forward function nodes associated with the security-sensitive variable by performing a forward slicing on the SDG;

obtaining, by the one or more hardware processors, a plurality of security parameters associated with the security-sensitive variable from the SDG;

obtaining, by the one or more hardware processors, a plurality of backward function nodes corresponding to the plurality of security parameters by performing a backward slicing on the SDG;

obtaining, by the one or more hardware processors, a plurality of matching function nodes by comparing the plurality of forward functions nodes and the plurality of backward function nodes;

enumerating, by the one or more hardware processors, a plurality of directed paths based on the plurality of matching function nodes using a Depth First Search (DFS) with backtracking;

evaluating, by the one or more hardware processors, a path condition associated with each function node of each of the plurality of enumerated directed paths to obtain a plurality of feasible paths, wherein the enumerated path is feasible only if the path condition associated with each function node is evaluated to true, wherein the method of evaluating the path condition associated with each function node of an enumerated path comprising:

identifying a type of an initial function node associated with the enumerated path, wherein the type comprises one of, a predicate node, an entry node, an exit node, a parameter node, an assignment node, an identity node and an invoke node;

obtaining a conditional expression corresponding to the initial function node when the type of the function node is a predicate;

extracting a plurality of operands associated with the conditional expression;

evaluating the conditional expression when each of the plurality of operands associated with the conditional expression are constant values, wherein definition of each of the plurality of operands is obtained recursively by traversing the path in the backward direction until a corresponding constant value is obtained when the operands associated with the expression are not constant values, wherein the definition is marked as undefined when the constant value is not found; and tagging the evaluated conditional expression to the predicate node, wherein each of the plurality of function nodes associated with the corresponding enumerated path is evaluated sequentially using the said method, wherein the evaluation is stopped if at least one function node is having an undefined definition; and analyzing, by the one or more hardware processors, each of the plurality of feasible paths based on a plurality of data conditions to identify a security vulnerability associated with the security-sensitive variable using a path-based security guarantee model, wherein the method of analyzing each of the plurality of feasible paths based on a plurality of data conditions to identify a security vulnerability associated with the security-sensitive variable comprising:

receiving the plurality of data conditions corresponding to each of the plurality of feasible paths, wherein the plurality of data conditions comprising the salt, the iteration count, and the key length associated with the plurality of backward function nodes;

comparing a value associated with each of the plurality of data conditions corresponding to each of the plurality of feasible paths with a corresponding predetermined value; and identifying a feasible path as a secure path when the value of each of the plurality of data conditions is greater than the predetermined value, the path enumeration is performed only on common function nodes obtained from the forward slicing and the backward slicing enabling reduced computational complexity and increased efficiency of computer system.

* * * * *